United States Patent [19]

Cyriax et al.

[11] Patent Number: 4,500,274
[45] Date of Patent: Feb. 19, 1985

[54] QUICK-CHANGE MOLD ASSEMBLY FOR INJECTION-MOLDING MACHINES

[75] Inventors: Wilhelm Cyriax, Meinerzhagen; Gerhard Tamboers, Plettenburg; Johannes Holzschuh, Meinerzhagen, all of Fed. Rep. of Germany

[73] Assignee: Battenfeld Maschinenfabriken GmbH, Meinerzhagen, Fed. Rep. of Germany

[21] Appl. No.: 488,755

[22] Filed: Apr. 26, 1983

[30] Foreign Application Priority Data

Apr. 26, 1982 [DE] Fed. Rep. of Germany ....... 3215567

[51] Int. Cl.³ .............................................. B29C 1/16
[52] U.S. Cl. ................................... 425/185; 425/186; 425/190; 425/542
[58] Field of Search ............... 425/183, 186, 190, 182, 425/542; 264/328.7, 185

[56] References Cited

U.S. PATENT DOCUMENTS 4,005,964 2/1977 Bishop .......................... 425/190 X
4,202,522 5/1980 Hanas ............................ 425/186 X

FOREIGN PATENT DOCUMENTS 56-70925 6/1981 Japan ................................. 425/542

Primary Examiner—Jay H. Woo
Assistant Examiner—Tinker R. McBrayer
Attorney, Agent, or Firm—Karl F. Ross; Herbert Dubno

[57] ABSTRACT

A rapid-change system for injection-molding machine has a pair of adapter plates secured to the respective mold parts which engage in guides of the mold-carrying plates of the machine so that nothing projects outwardly beyond these adapter plates. Locks on the mold-carrying plates hold the adapter plates in position and the plates can be provided with service fittings which interconnect and disconnect upon insertion and removal of the molds together with the respective adapter plates.

19 Claims, 11 Drawing Figures

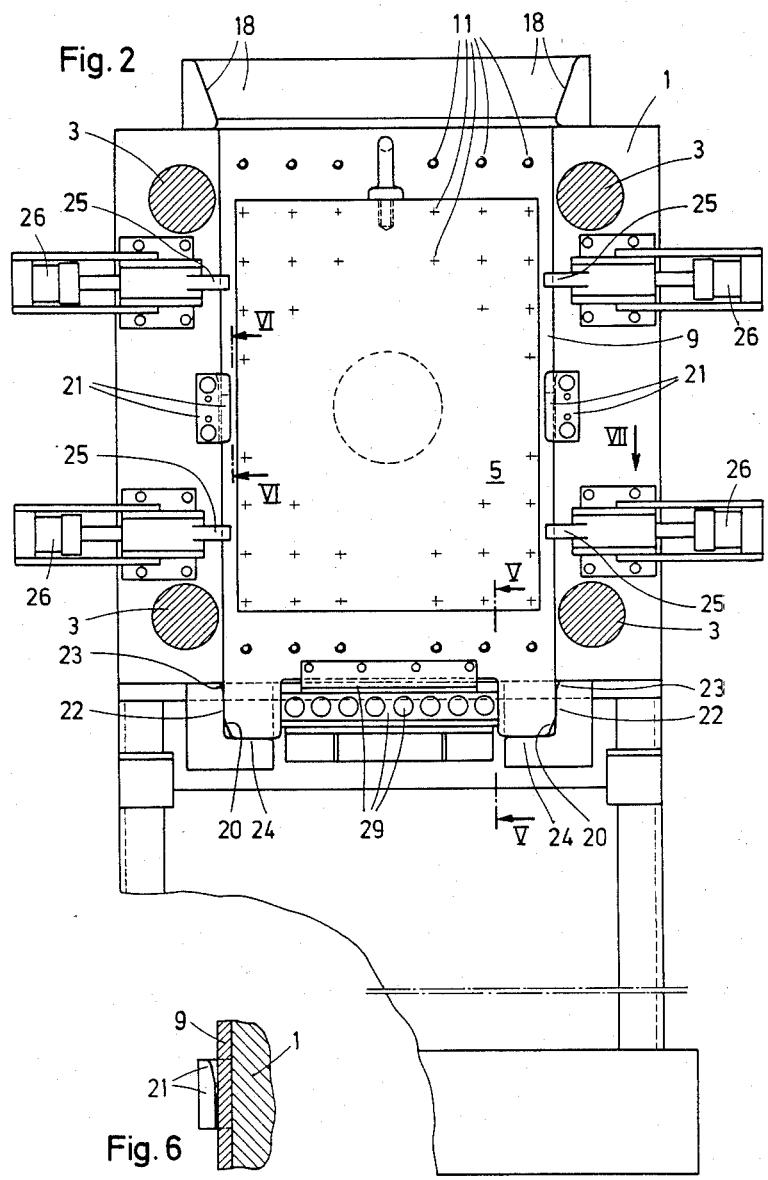

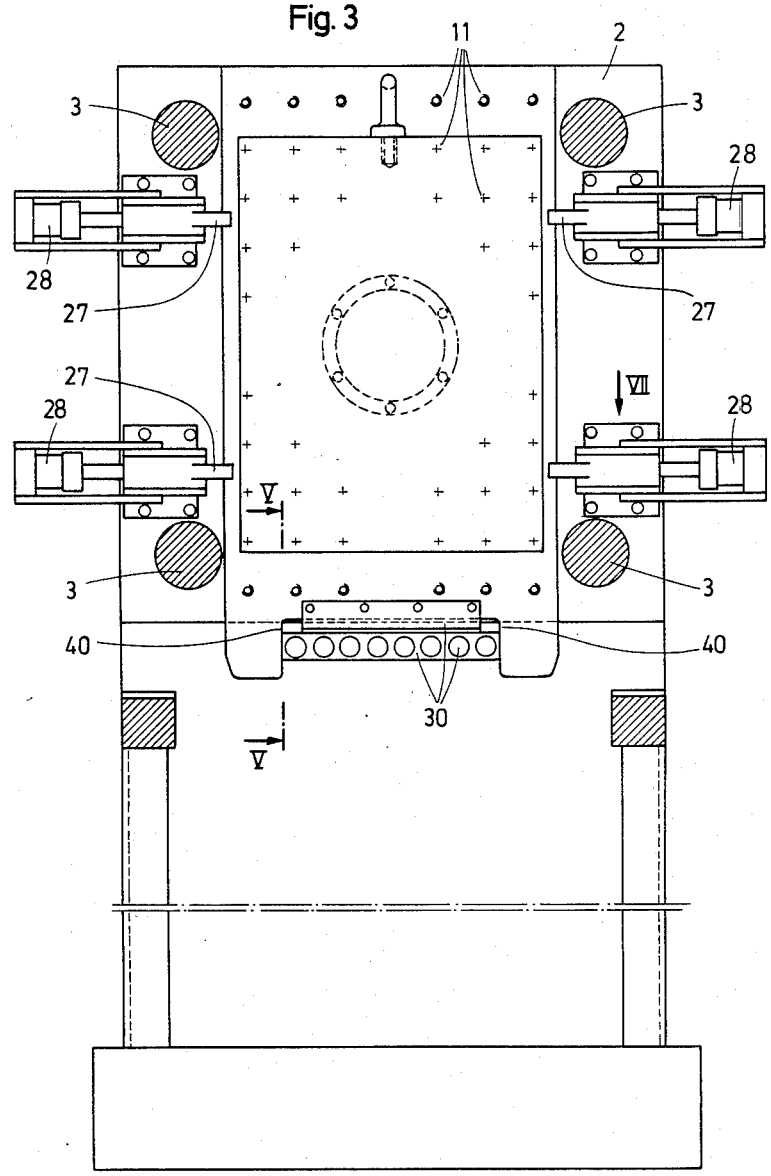

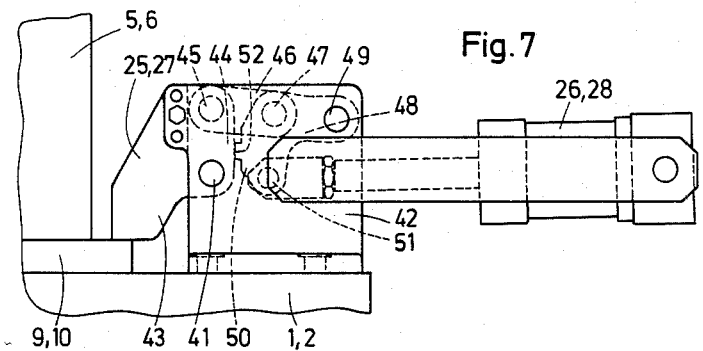
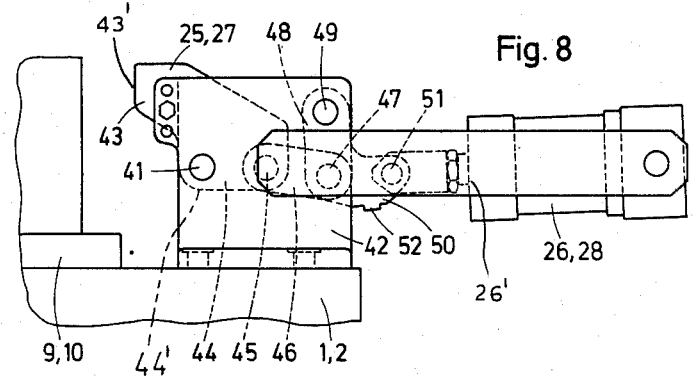
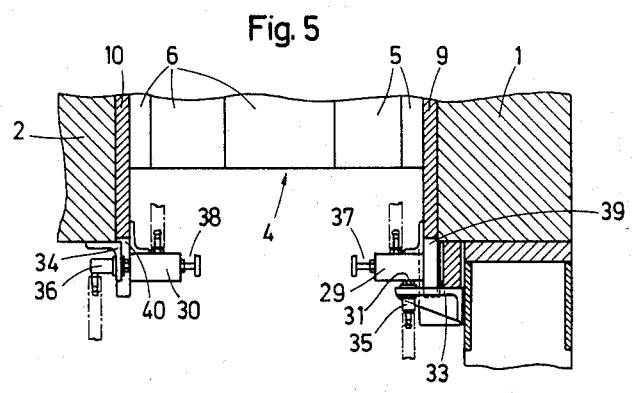

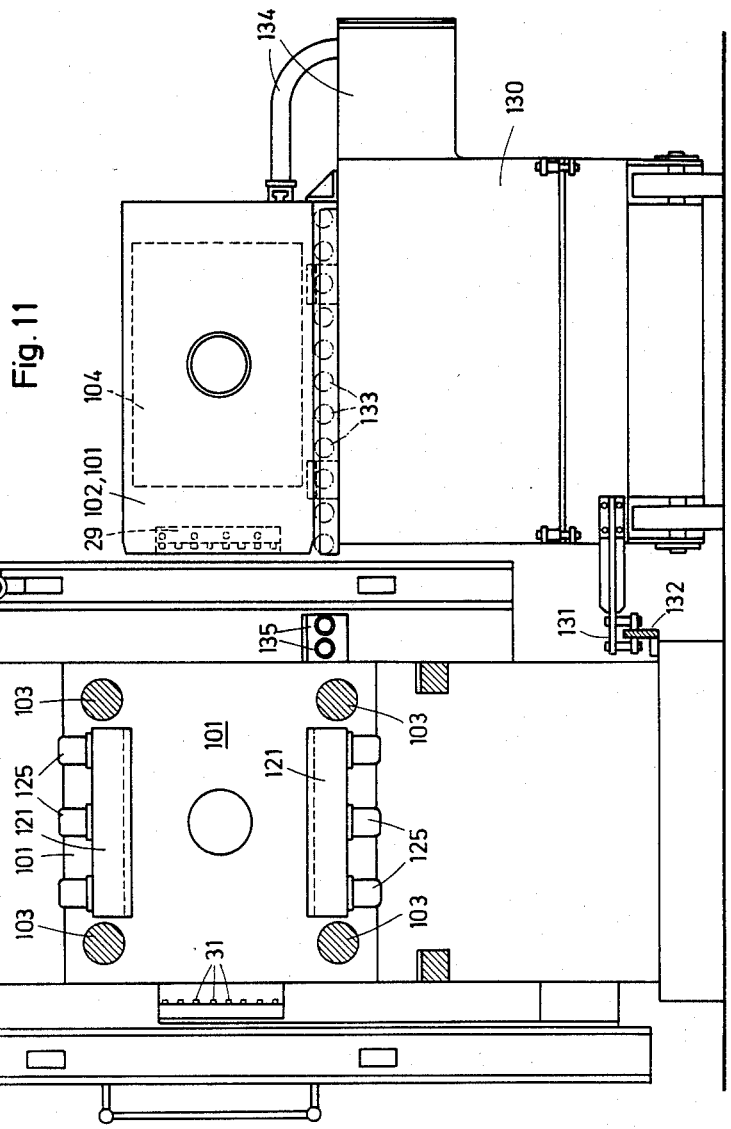

QUICK-CHANGE MOLD ASSEMBLY FOR INJECTION-MOLDING MACHINES

CROSS REFERENCE TO RELATED APPLICATION

This application is related to the commonly assigned copending application Ser. No. 488,781 filed Apr. 26, 1983. Reference may be had in conjunction therewith to the commonly owned U.S. Pat. No. 3,608,133, 3,666,387, 3,687,590 and 3,669,593.

FIELD OF THE INVENTION

Our present invention relates to a quick-change mold assembly for an injection-molding machine and, more particularly, to an arrangement which allows a mold, especially a two-part separable mold, to be quickly mounted between the relatively movable mold-carrying platens or plates of an injection-molding machine in which at least one of the plates can be displaced toward the other as part of the mold-closing operation and can hold the mold closed while a synthetic resin or other settable material is injected into a mold cavity.

BACKGROUND OF THE INVENTION

Injection-molding machines generally comprise a device for moving one such plate toward and away from another plate and may include hydraulic or other power systems for moving this plate or both plates in a mold-closing or mold-opening operation. For example, the movable plate or plates may be mounted on pistons of hydraulic cylinders which move the plates carrying the mold halves toward one another in the mold-closing operation in which the mold halves are held forceably together against the injection pressure which develops within the mold cavity. Means is provided in at least one of the plates for injecting the settable material into the mold cavity therethrough and it is customary to provide these plates with means for attaching the respective mold halves thereto.

The mold itself may consist of two or more relatively movable parts which, when brought together, define the mold cavity into which the material can be injected.

In general, one of these parts, referred to for convenience as a mold half whether or not it consists of a complete half of the mold structure, is secured to one plate for movement therewith while the other mold half is secured to the other plate.

Since injection-molding machines are comparatively expensive and a long downtime may result in a substantial drop in the output of a plant, the time required for changeover of a mold, e.g. for production of a different item or simply for replacement of a worn or damaged mold, is a problem. Efforts have been made to reduce the downtime by providing quick-change mold systems, i.e. mold assemblies which can be introduced and removed relatively rapidly and which minimize hand efforts which are required to secure the mold parts to the respective plates.

One such quick-change system is available from the Austrian firm Ludwig Engel KG Machinenfabrik, A-4311 Schwertberg, Austria and is described in a prospectus identified as Engel Information A-67-TV-9/81. In this arrangement, a mold provided with a clamping device to hold the parts together or a device for aligning them and retaining them in alignment in a closed state, can be bodily introduced between the plates of the injection-molding machine. The two mold halves are thus in a comparatively short time affixed to the injection-molding machine plates or released therefrom so that downtime for mold replacement is minimized.

It is, however, a residual disadvantage of this system that, for security each mold half much be secured at its rear side and via traction bolts projecting therefrom, aligned with and secured to or centered on the mold-carrying plates of the injection molding machine.

Thus, notwithstanding the fact that the earlier system permitted fairly rapid mold replacement, problems of alignment and positioning continued to confront the art.

Another disadvantage of such earlier systems, resulting from the way in which the mold halves are mounted on the plate, is that for mold replacement, i.e. removal and attachment, it is necessary to shift each mold half and the respective mold-carrying plate in the direction of the opening and closing movement, notwithstanding the fact that the introduction of the mold into position and its removal are best effected transversely to this direction.

This complicates the manipulative steps, and because outwardly projecting bolts, alignment pins and like formations are provided on the backs of the mold halves, the molds cannot readily be stored or even handled with ease.

Still another disadvantage of the earlier systems is that the mold replacement cannot be conveniently monitored, i.e. it is difficult to see how the parts are being aligned or relatively positioned during the mold replacement operations. It is therefore necessary to provide indicators for locking devices such as the locking keys which can display the position of the parts which must secure the mold halves to the mold plates. In general, therefore, while the earlier system has advanced the art by simplifying mold replacement to a certain extent, it has not fully solved the problems and is itself accompanied by problems which make use of the system difficult.

OBJECTS OF THE INVENTION

It is the principal object of this invention to provide an improved and quick-change and quick-locking system for the mold of an injection molding machine whereby the aforementioned drawbacks of earlier systems are avoided and a rapid mounting and dismounting of the mold is possible without inconveniences which arise from the need for projecting alignment or fastening pins or bolts at the rear of each mold half.

Another object of this invention is to provide a rapid-change mold assembly for an injection-molding machine which not only allows rapid, simple and reliable removal and replacement of the mold, but which permits a minimum spacing between the mold-carrying plates to be maintained during these replacements and also allows simple monitoring of the replacement and remounting operations as well as of the locked status of the replacement mold.

SUMMARY OF THE INVENTION

These objects and others which will become apparent hereinafter are attained, in accordance with the present invention, in a quick-change mold system for an injection-molding machine comprising a pair of mold carrying-plates, means for relatively displacing these plates by the movement of at least one of them toward and away from the other, and means for injecting a flowable but settable material into a mold cavity formed by at least a pair of separable mold members together forming an injection mold and respectively mounted on these plates, whereby the mold members can be locked together in an aligned position.

According to this invention, each of the separable mold members is provided with an adapter plate along the back thereof and each of these adapter plates has a planar surface free from projections along the back flank thereof juxtaposed or confronting the respective mold-carrying plate. Each mold-carrying plate is provided with clamping means engageable with the respective adapter plate for releasably locking the same to the respective mold-carrying plate.

At least one of the mold-carrying plates is provided with guide means engageable with the respective adapter plate to enable the latter to be slid transversely to the mold-opening and closing direction into position on this mold-carrying plate so that the locking means can then secure the respective mold members via their adapter plates to the mold-carrying plates. At least one abutment is provided transverse to the direction in which the mold is slid along the guideways formed by the guide means can be provided the intercept in its centered position. The term "centered" when it is used to refer to this latter position, is intended to indicate that the mold will then be properly aligned with the mold-carrying plates and any means thereon or associated therewith for delivering the flowable material to the mold cavity, for ejecting molded articles or for the effective use of accessories associated with injection molding.

Thus the invention provides that at least one of the mold-carrying plates is formed with the guide means which can define a guideway transverse to the mold-opening and closing direction, at least one of the mold-carrying plates can have an abutment capable of intercepting a respective mold member when the adapter plate of one of the mold members is shifted along the guideway, and both of the mold-carrying plates are provided with locking means engaging the respective adapter plates to couple the respective mold member to that mold-carrying plate.

As a consequence, the system of the invention differs from the system described earlier in that each mold half is provided on its back with an adapter plate, i.e. is premounted on a respective adapter plate, and in that the guideways of at least one of the mold-carrying plates defines a linear path for the adapter plate which allows the mold to be introduced between the two mounting plates to the centered or aligned position in which it is engaged by the aforementioned abutment and thus can be locked in place by clamping means engageable with the adapter plates and retaining them against the respective mold-carrying plates.

This arrangement allows a rapid removal and replacement and a rapid locking of the mold in place without requiring a gap materially larger than the combined thickness of the mold parts between the two mold-carrying faces of the two adapter plates when the mold parts are held together. This not only allows the injection-molding machine to be more compact, since it does not have to open wider than this spacing except as may be required to release molded articles, and simplifies replacement and positioning of the mold.

According to another feature of the invention, means is provided for holding the mold assembly, consisting of the adapter plates, the separable mold parts and any intermediate members connected thereto, in a closed condition or position between the mold-carrying plates.

The latching means can engage the mold plates, one mold plate and the mold part associated with the opposite adapter plate, two opposite mold parts, or any combination thereof. A latch member, which may be linearly shiftable or pivotally displaceable, can be provided for this purpose.

The guideway can be constructed to engage, preferably peripherally or centrally, this adapter plate. For example, the adapter plate may have a groove which can receive a ridge or guide structure or key formed on the mold-carrying plate, the mold-carrying plate can be provided with a pair of ledges receiving edges of the adapter plate parallel to its direction of insertion into the machine, or any combination of grooves and like formations can be provided to permit the adapter plate to be guided linearly into position on the mold-carrying plate.

Of course, both mold-carrying plates can be provided with such guides to engage the respective adapter plates or, alternatively, one of the mold-carrying plates can be provided with such a guideway while the other mold-carrying plate is brought into contact with its adapter plate by a movement of the mold or the last mentioned mold-carrying plate in the mold-opening and closing direction to allow the locking means for securing the adapter plates to the mold-carrying plates to become effective. In the latter case the "guideway" of the movable platen engages the adapter plate in the mold-closing direction.

In these arrangements, the result is that both adapter plates are ultimately releasably locked onto the respective mold-carrying plates. For safety reasons, it is advantageous to first position the adapter plate of one mold part to the assembled mold in the aforedescribed manner, to lock this adapter plate to its mold-carrying plate, to then bring the juxtaposed other mold-carrying plate and adapter plate into position and lock them together and then to release the connection between the mold parts and, if necessary, to loosen one or another of the sets of locks retaining the adapter plates on the mold-carrying plates for final adjustment and centering.

When one of the mold-carrying plates is a fixed plate, preferably it is provided with the guide means described previously.

According to another feature of the invention, each adapter plate is formed with a support or bracket having fittings in an appropriate pattern for engagement with complementary fittings of the respective mold-carrying plate or a corresponding part of the injection-molding machine, these fittings forming electrical or fluid service fittings for carrying electrical energy or fluids of the mold cavity or in association therewith. Such fluids can include power fluids for actuating operators of the mold assembly, can include cooling fluids and lubricants, or the like. Consequently, the two plates to be brought together on each side of the mold, namely the mold-carrying plate and the respective adapter plate are provided with brackets or holders for respective arrays of mutually engaging service fittings. These patterns or holders for the fittings can be self aligning, i.e. relatively movable so as to align automatically when the plates are brought together when a mold-carrying plate is inserted transverse to the opening and closing direction, or when a movable plate is brought into engagement with the juxtaposed plate in the mold-closing direction as described.

Thus the invention provides that the plates have complementary arrays, layouts or organizations of fittings for electrical and fluid service connections so that, where such service connections are required, each adapter plate can be formed with or have removably attached thereto, an appropriate support with the corresponding fittings in the necessary predetermined spacing and organization. The two sets of fittings, supports and the like can be self-aligning or can be aligned by the guideway previously described and/or the abutment means.

As a consequence, the downtime required for connection of fluid circuits or electrical systems when one mold is replaced by another can be eliminated since the service connections are automatically made when a new mold is introduced and are broken when the previous mold is removed. When fluid fittings are used, these can be provided with self-closing valves to prevent loss of fluid.

According to another important feature of the invention, the guideway and the abutment are provided on one of the mold-carrying plates for cooperation with complementary formations on the associated adapter plate, the formations to the extent that they serve as guides extending in the direction of insertion of the mold into the machine. The opposite pair of plates can be provided with fittings which extend in the direction in which adjustment may be required for centering.

In this arrangement, therefore, the connection of energy and fluid networks to the mold can be simplified.

It has also been found to be advantageous to equip the support previously mentioned with control, regulatory and like valves or other control units cooperating with the energy or fluid networks so that, for example, the specific mold insertion will automatically set these units to the requisite flow cross sections or coolant flow rates for proper functioning of the injection-molding machine with this mold. In other words, the mold itself cooperates with the process control elements of the injection-molding machine so that the mere replacement of the mold will automatically reset the machine to the extent necessary for producing the items defined by the mold cavity of this mold.

In structural terms, we have found it to be advantageous to provide a cutout in the adapter plate to accommodate the support and the fittings and to have the abutment means and positioning means for the fittings located laterally of this cutout and the support.

We have also found it to be desirable to form the clamping means from a number of clamping devices each of which consists of a fluid actuated finger engageable over an edge of the respective adapter plate from a location laterally outwardly thereof and actuated by a fluid-operated cylinder and preferably a toggle linkage. In this fashion the finger cannot only be displaced into a position in which it can be withdrawn from the edge laterally for positioning, but can engage over the edge of the adapter plate when necessary. The double-toggle linkage can form a four-point two-lever linkage as will be described in greater detail hereinafter.

More specifically, the swingable finger can comprise an arm of a double-arm lever whose second arm, in the engaged position of the finger lies against an abutment on a link displaced by the piston of the fluid cylinder via a second toggle lever.

Consequently, since a link connects the two levers and serves to displace the finger while the second lever directly abuts the first lever in the engaged position, the lock-retaining force need not be transmitted through the link and greater reliability and security is achieved. When the finger is swingable through about 90° and is raised in its effective position, it can lie approximately along the plane of the edge of the adapter plate while its link can be substantially in line with the piston and the pivot of the first lever.

Through the use of a double-toggle lever system, the locking finger can be swung quickly and completely out of the way to release the adapter plate while, on the other hand, when it is pressed into engagement therewith, can retain the plate even if the fluid pressure should fail.

For rapid replacement of the mold, moreover, it is advantageous and indeed important to form the guide channels with outwardly divergent flanks and the leading edges of the adapter plate to be received in the channel with inwardly convergent guide flanks thereby simplifying insertion of the adapter plate into the guide.

The guide can include a bar mounted upon the mold-carrying plate and having outwardly convergent flanks receivable between outwardly divergent flanks of the groove or track of the adapter plate.

The bar can be formed in one piece with protuberances which cooperate with cams or the like.

Such cams can form wedges operated by individual fluid pressure cylinders and such cylinders can be seated against or located along outer surfaces of the bar.

BRIEF DESCRIPTION OF THE DRAWING

The above and other objects, features and advantages will become more readily apparent from the following description, reference being made to the accompanying drawing in which:

FIG. 2 is a cross-sectional view taken along the line II—II of FIG. 1;

FIG. 3 is a cross-sectional view taken along the line III—III of FIG. 1;

FIG. 5 is a section taken along the line V—V in FIG. 2 or FIG. 3;

FIG. 6 is a section taken along the line VI—VI of FIG. 2;

FIG. 7 is a detail view drawn to a larger scale and generally in the direction of the arrow VII in FIG. 2 or FIG. 3;

FIG. 8 is a view corresponding to FIG. 7 but showing the locking device thereof in another position;

FIG. 11 is a diagram representing a simplified vertical section of an injection-molding machine with means for changing the mold.

SPECIFIC DESCRIPTION

Figure 1:
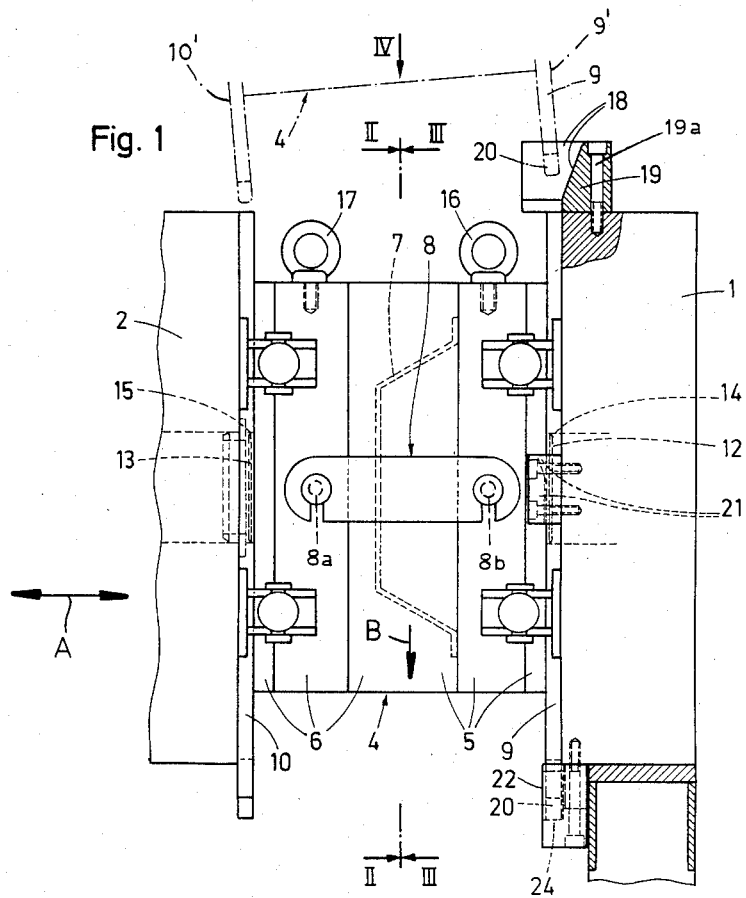
FIG. 1 is a diagrammatic side-elevational view of the mold-receiving region of an injection-molding machine of the type described and provided with the quick-change system for the mold in accordance with this invention.

In FIG. 1, we have shown an injection-molding machine of conventional design except for the system for replacing the mold. This machine comprises a fixed mold-carrying plate or platen 1, and a movable mold-carrying plate or platen 2, the latter being displaceable in a mold-opening and closing direction represented by the arrow A away from and toward the fixed plate 1.

To align the two plates during injection molding and for the mold-opening and closing directions, horizontal guides can be provided, generally in the form of four horizontal bars 3 of round cross section which cannot be seen in FIG. 1, but are visible in FIGS. 2 and 3 and are located close to the corners of the plates 1 and 2.

An injection mold 4 can be received between the two mold-carrying plates, 1, 2 and generally comprises a pair of mold halves represented at 5 and 6, respectively, and shown to define the mold cavity 7.

Each of these mold halves may, in turn, be made up of a number of mold parts. One or both of the mold halves can be provided with ejector pins and a mechanism for ejecting the molded article.

One or both of the mold halves may be provided with cooling channels, lubricating channels and the like for permitting fluids to pass through or emerge at surfaces of the mold. One of the mold halves, generally the stationary mold half, is also provided with a passage through which the injection cylinder of the machine can be connected to the mold cavity through an appropriate passage in the mold half connected to this plate. The injection molding cylinder can be provided with a horizontally displaceable worm which is rotated to plastify a thermoplastic synthetic resin, for example, and is axially displaceable to drive the flowable material into the mold cavity. Those elements just described are conventional in the art and are understood as being present in the part of the injection-molding machine carrying the mold-carrying plates 1 and 2. Furthermore, a hydraulic piston and cylinder arrangement is also provided to displace the mold-carrying plate 2 horizontally and to clamp the mold in its closed position for injection-molding operations. This structure, too, is understood as being present when reference is made to the injection-molding machine.

The mold 4 can be replaced as a unit and the insertion of a mold 4 is represented in dot-dash lines in FIG. 1 to hold the unit together for this insertion and for the removal of the mold, a latch 8 is provided which engages over pins 8a and 8b of the two mold halves to hold them together. After insertion of the mold between two mold-carrying plates, the latch 8 is removed so that the mold can be selectively opened and closed in the usual manner.

The mold half 5 is premounted on a flat adapter plate 9 while the mold half 6 is premounted on a flat adapter plate 10 so that the assembly 4, 9, 10 has no projections extending outwardly from the lateral planes 9' and 10' at the backs of the respective premounted mold halves.

All of the adapter plates 9, 10 to be used on the given mold-carrying plates 1 and 2 have the same dimensions regardless of the shapes and dimensions of the mold halves 5 and 6 carried thereby, i.e. are standard. The molds themselves, therefore, can vary widely in form and dimensions but can all be mounted in the machine utilizing the standard pair of adapter plates 9 and 10 which can be provided with a multiplicity of holes at locations represented at 11 in FIG. 2, for example, preferably in the form of threaded bores, which can receive screws for premounting the various shapes of mold halves on these plates. The bores preferably are in locations representing a regular grid so that adaptation to mold halves with a variety of spacings of the attachment screws, albeit with unit dimensions corresponding to the unit spacing of the grid, is possible.

Exact positioning of the mold halves 5 and 6 on the adapter plates 9 and 10 can be effected via centering formations 12 and 13 on the backs of the mold halves which engage with a tolerance fit in centering recesses 14 and 15 of the adapter plates 9 and 10 i.e., snugly engage with a self-centering action. The recesses 14 and 15 in the adapter plates 9 and 10 can be machined accurately therein so that these recesses are exactly aligned horizontally when the plates engage respective stops or abutments on the mold-carrying plates as will be described.

Mold exchange or replacement, as is evident from the dot-dash shown in FIG. 1 is effected by movement of the mold transversely to the mold-opening and closing direction A, i.e. by withdrawing the mold upwardly. For this purpose, the plant can be provided with a crane having hooks which engage in eyes 16 and 17 of the mold halves so that the mold can be lifted out of the position shown in FIG. 1, transferred to a storage or repair location, and a different mold lowered into position between the mold-carrying plates. Note that it is not necessary to spread the mold-carrying plates apart by much more than the distance between the planes 9' and 10' for the claimed system to be operative.

Figure 4:
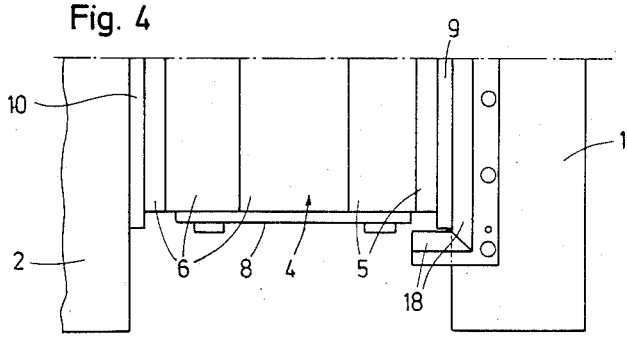
FIG. 4 is a partial plan view taken in the direction of the arrow IV in FIG. 1.

For precise positioning of the mold without manual adjustments and the like, guide surfaces 18 are provided in a guide element or bar 19 of generally "U"-plan configuration can be mounted on the top of the stationary mold-carrying plate 1 by bolts 19a. The surfaces 18 are inclined inwardly and a downwardly i.e. are beveled in a funnel-like manner as is clear from FIGS. 1, 2 and 4.

These guide surfaces and the complementarily beveled surfaces 20 at the lower end and outer edges of the adapter plate 9 thus define a precise lateral orientation of the plate 9 as it is lowered into engagement with linear guides 21 and 22 which form insertion guides, i.e. guides which precisely define a linear path for the plate 9 once a portion of this plate is inserted into the guide. The linear guides 21 and 22 are provided upon the stationary mold-carrying plate 1. The guides 21 and 22 extend in the vertical direction, i.e. normal to the direction of the displacement A of the movable mold-carrying plate and the guides are designed as well not only to prevent lateral movement transversely to the arrow A and to the vertical direction, but also displacement parallel to the direction of arrow A.

The insertion of the adapter plate 9 in the lower guide 22 is facilitated by the cooperation of the bevels 20 with the complementary bevels 23 of the guide 22.

The precise end position of the adapter plate 9 and hence of the entire mold 4 is determined by the abutment 24 which is affixed to or formed on the stationary mold-carrying plate 1 as will be clear from FIGS. 1 and 2. This abutment extends into the path B of the adapter plate 9.

Once the adapter plate 9 is seated against the abutment 24, a plurality of clamping units, preferably four for each plate, can be actuated. These clamping units have fingers 25 which are actuated by hydraulic cylinders 26 and engage the vertical edges of the adapter plate 9 to hold it against the mold-carrying plate 1.

Similarly, the movable mold-carrying plate 2, when shifted against the adapter plate 10 by movement to the right (see arrow A) can have four pressing fingers 27 actuated by cylinders 28 to retain the adapter plate 10 against the mold-carrying plate 2 in the precise desired position on the latter.

The latch 8 can then be removed and the mold opened and closed in the usual manner.

To minimize the downtime during changeover of the mold, each of the adapter plates 9 and 10 can be provided with a respective support 29 or 30 which can carry connecting fittings 31 and 32 in a predetermined grid pattern or spacing for energy (electrical power) and fluid-medium connection of the mold to complementary fittings 35 and 36 in the same pattern of distribution on supports 33 or 34 on each of the mold-carrying plates 1 and 2.

The arrangement of the fittings 31 on the adapter plate 9 and the fittings 35 on the mold-carrying plate 1 is thus such that during insertion of the adapter plate 9 into the guides 21 and 22 and its contact with the abutment 24, these fittings are mutually coupled with precision.

On the other hand, the connecting fittings 32 on the adapter plate 10 and the complementary fittings 36 on the mold-carrying plate 2 are so arranged that they exactly and automatically couple horizontally when the mold-carrying plate 2 is horizontally displaced against the mold 4 previously positioned on the mold-carrying plate 1.

The supports 29 and 30 of the adapter plates 9 and 10 can have valves 37 and 38 or similar control or setting elements for the electrical energy or for the fluid media. These valves or other control elements receive their settings by the insertion of the mold in place to thereby set fluid-flow or electric-flow conditions accordingly.

For effective activation and inactivation of these control elements and to protect the supports, the connecting fittings and the valve or other control elements against damage, the adapter plates 9 and 10 which cooperate with the abutment 24 are provided with cutouts 39 and 40 in the region of which the supports 29 or 30 and 33 or 34 are located while the abutments 24 are disposed laterally thereof.

From FIGS. 7 and 8, it can be seen that the pressing fingers 25 and 27 operated by the fluid pressure cylinders 26 and 28 are connected thereto by a two-lever toggle linkage.

Specifically, each pressure finger 25 or 27 is a double-arm lever fulcrumed at a pivot 41 in a mounting block 42 affixed by bolts or the like to the respective mold-carrying plate 1 or 2.

The free end of the lever forms one of the arms 43 thereof and constitutes the finger proper which presses against the upper surface of the plate 9 or 10 as shown in FIG. 7.

The other lever arm 44 is connected by a pin 45 to a link 46 which, in turn, is pivotally connected at 47 to a lever 48 fulcrumed at 49 on the block 42.

The lever 48 is spaced from the pivot 47 in a direction away from the pivot 49, a pivot 51 connecting its arm 50 to the piston rod of the cylinder 26 or 28 which is mounted by a bar 26' on the block 42. An abutment face 52 is provided to engage the edge 44' on the lever formed by the arms 43 and 44.

Thus, when the arm 43 is swung in the counterclockwise sense from its inoperative position shown in FIG. 8, where the surface 43' clears the plate 9 or 10, into the position shown in FIG. 7, the projection 52 comes to abut the surface 44 and hence the two levers directly contact above the fulcrum 41 to prevent the arm 43 from swinging upwardly unless the piston rod is retracted to the right. Thus even if the power should fail and the pressure in cylinder 26 should somewhat relax, the holding force of the fingers will not be relieved.

One of the most important advantages of this construction is that the fingers can lie along portions of the mold-carrying plate which can be visually monitored and have positions which are readily recognized so that separate signal means need not be provided to signal the state of operation of the locks.

Figure 9:
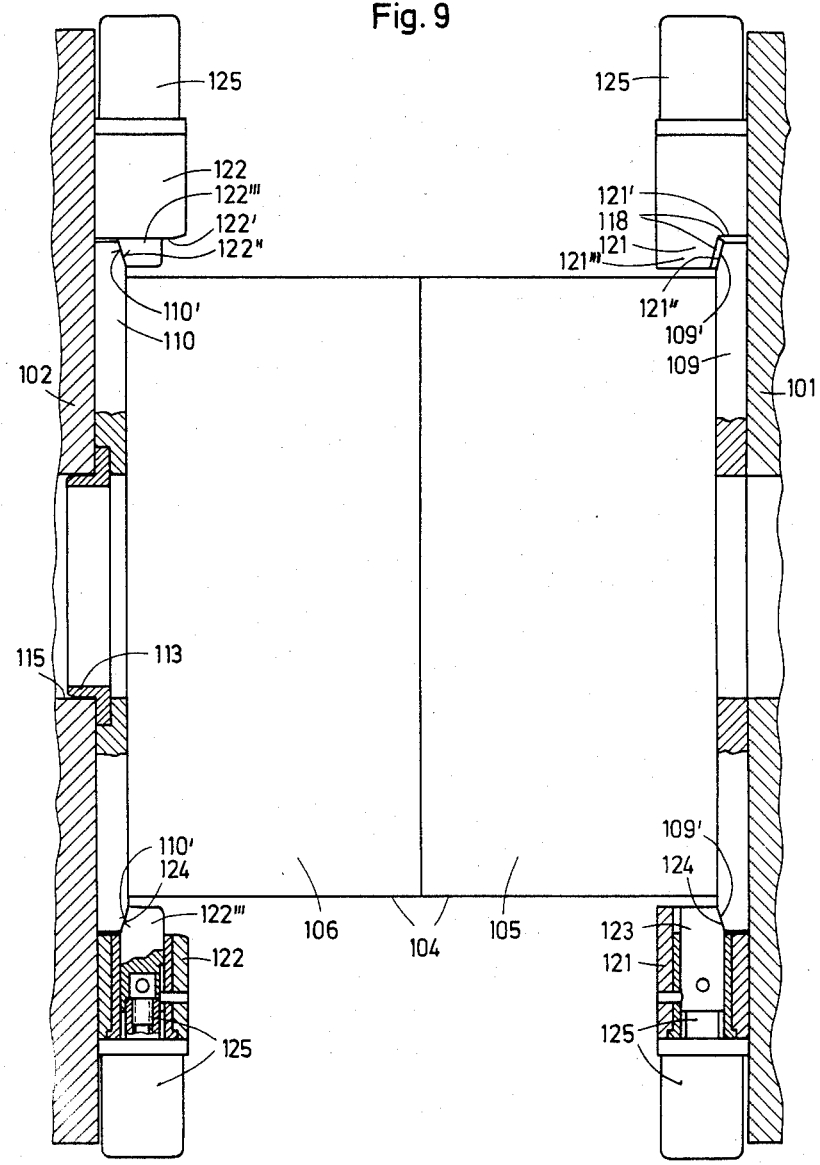
FIG. 9 is a view similar to FIG. 1 of another injection-molding machine utilizing similar principles and partly in cross section.

The embodiment of FIG. 9, is also a conventional injection-molding machine having a fixed mold-carrying plate 101 and a horizontally shiftable mold-carrying plate 102.

FIG. 11 shows an injection-molding machine of conventional design as well, but purely diagrammatically and illustrates how this machine has four alignment bars 103 for guiding the movable mold-carrying plate.

FIGS. 9 and 11 also show that various molds 104 can be received between the mold-carrying plates 101 and 102 of the injection-molding machine and can be constituted with two mold halves 105 and 106 which have not been illustrated in any detail. While the embodiment of FIGS. 1-8 operates by a mold change in the vertical direction, in the embodiment of FIGS. 9-11, the mold change is effected in the horizontal direction as is especially clear from FIG. 11.

Here as well, it is preferable to lock the two mold halves 105 and 106 of the mold 104 in a closed position by respective latch means for the mold-changing operation and then to remove or disable this latch means for the opening and closing operations of the mold.

The mold half 105 (FIGS. 9 and 10) is premounted on a flat adapter plate 109 while the mold half 106 is premounted on a flat adapter plate 110.

For this embodiment as well all of the adapter plates 109 and 110 should have identical dimensions so that the same plates can be used for a variety of mold shapes and dimensions.

Mold replacement and insertion is here effected in the horizontal direction. To this end, a special mechanism may be provided as is shown and described with reference to FIG. 11 and the aforementioned copending application.

To insert the mold between the mold-carrying plates 101 and 102, the latter are drawn apart only sufficiently to receive the mold assembly consisting of the mold and the adapter plates. Horizontally, but transversely to the opening and closing direction, the adapter plate 109 is shifted along the guide 121. The guide 121 is formed by a pair of bars on the mold-carrying plate 101 in mirror-symmetrical relationship and parallel to the horizontal direction of displacement of the adapter plate 109. These bars have a surface directed parallel to this displacement and a surface 121″ inwardly of the face 109′ of the adapter plate 109 to engage over this surface. This is clear from FIGS. 9 and 10.

The abutment surfaces for the adapter plate parallel to its plane and in the direction of feed of the latter in the guide 121 are formed by projection 121‴ unitary with the bar 121 with the contacting surfaces of the adapter plate and these members being inclined to the face of the mold-carrying plate 101.

To facilitate the insertion of the adapter plate 109 into the guide 121, surfaces 118 inclined to the direction of insertion (FIG. 9) are provided for cooperation with the complementary guide surfaces 120 at the leading end of the adapter plate 109.

The guide surfaces 121' and the support or abutment surfaces 121" of the rail-forming guide 121 position the entire mold 104 and the adapter plate 109 thereon parallel to and exactly against and upon the mold-carrying plate 101 and center and align the two.

To retain the adapter plate 109 against the mold-carrying plate 101, clamping devices in the form of transversely shiftable cams 123 can be provided. These cams can be formed with wedging surfaces 124 and are shiftable in the rails formed by the guides 121 by fluid pressure cylinders 125 disposed on the outer side of each rail as will be apparent from FIGS. 9-11.

After the mold is fixed to the plate 101 by its adapter plate 109 and, of course, is centered and aligned thereon, the movable mold-carrying plate 102 can be displaced horizontally against the adapter plate 110 of mold half 106. The adapter plate 110 then engages via its horizontal longitudinal edges, the horizontal guide surfaces 122' forming guide bars 122 mounted on the juxtaposed face of the mold-carrying plate 102 (FIGS. 9 and 10).

Before the adapter plate 110 comes to rest flat against the mold-carrying plate 102, a centering formation 113 can engage a centering recess 115 of the mold-carrying plate 102 for exact alignment of the mold half 106 on the associated mold-carrying plate 102.

The final locking of the adapter plate 110 and its mold half 106 on the mold-carrying plate 102, is effected by linearly shiftable cams 122''' which are movable in the guide 122 and have similar wedging surfaces 124. The cams 122''' also are preferably actuated by respective pressure cylinder lying externally of the bars 122. The wedging surfaces 124 cooperate with correspondingly inclined bevels 110' of the adapter plate.

Figure 10:
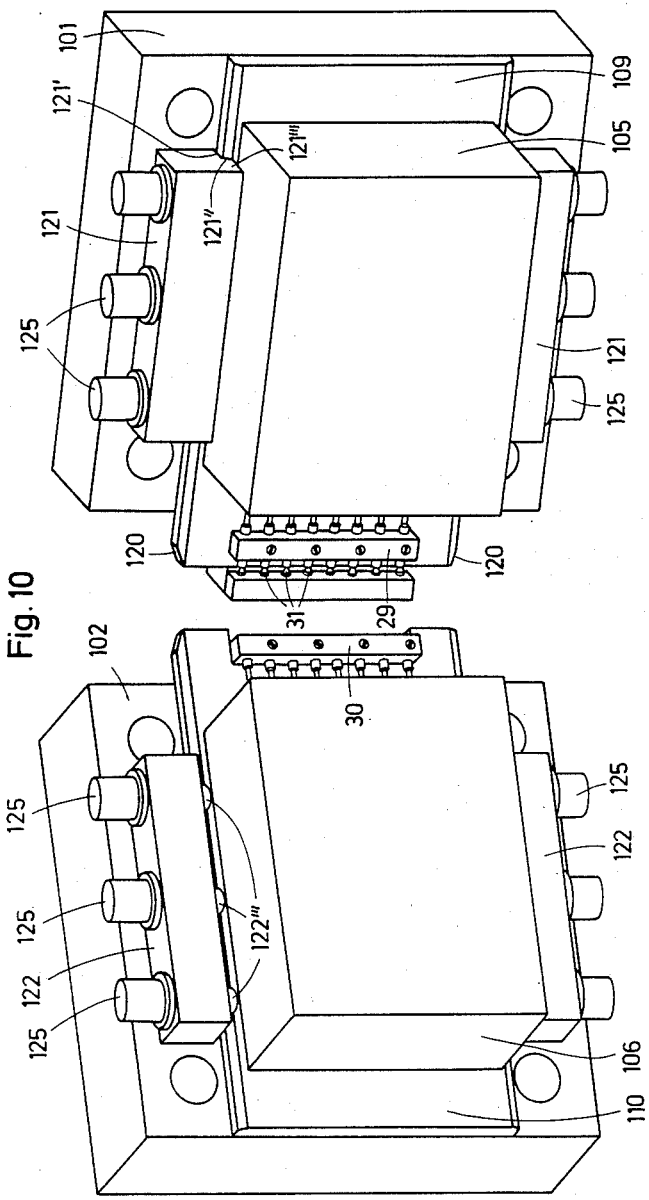
FIG. 10 is an exploded view, partly rotated, showing the two mold-carrying plates of the embodiment of FIG. 9 and respective mold halves which have been illustrated only diagrammatically and do not show a mold cavity.

The rapid-change system of FIGS. 9 and 10 thus constitutes a comparatively simple and compact system requiring little space and adapted for use with molds of comparatively small height.

The injection-molding machine (FIG. 11) may be associated with a carriage 130 for the molds 104 to be interchanged. The carriage 130 is shiftable by a drive mechanism 131 along a horizontal fixed rail 132. The carriage 130 is formed with a roller conveyor 133 receiving the mold 104, and for example, carrying the lower longitudinal edges of the adapter plates 109 and 110.

A shifting unit or pusher 134 is provided to engage the mold and shove it laterally into the injection-molding machine or to engage the mold within the molding machine and withdraw it onto the roller conveyer.

In some cases, it is advantageous to provide a fixed roller conveyer 135 adjacent the injection-molding machine or on the latter to assist in inserting and withdrawing the mold (see the aforementioned copending application).

We claim:

1. In an injection-molding machine having a pair of mold-carrying plates at least one of which is adapted to be displaced toward and away from the other in a mold-opening and a mold-closing direction, a quick-change mold system which comprises:

a mold having a pair of separable mold parts adapted to define an injection mold cavity;

a respective adapter plate bolted to each of said parts and confronting the respective one of said mold-carrying plates;

guide means on only one of said mold-carrying plates forming a linear guide path for the respective mold-adapter plate and the respective mold part affixed thereto whereby said mold between said adapter plates can be shifted along said path between said mold-carrying plates transversely to said direction;

latch means for coupling said parts together in a closed position of said mold for introduction of said mold between said mold-carrying plates into and for withdrawal out of position in said machine;

abutment means on said one of said mold-carrying plates transverse to said direction forming a stop for at least one of said adapter plates along said path thereby aligning said one of said adapter plates with the respective mold-carrying plate; and locking means on said mold-carrying plates for engagement with said adapter plates to retain said adapter plates against the respective mold-carrying plates during opening and closing of the mold, said locking means including a plurality of releasable clamps on the other of said mold-carrying plates shiftable to engage over the confronting adapter plate.

2. The injection molding-machine defined in claim 1 wherein said one of said mold-carrying plates is fixed on the other mold-carrying plate, is displaceable toward and away from said one of said mold-carrying plates and during displacement toward said one of said mold-carrying plates engages the respective adapter plate to be locked thereto.

3. The injection molding-machine defined in claim 1 wherein at least one of said adapter plates is provided with a support and a plurality of service fittings in predetermined spaced-apart relationship on said support, the respective mold-carrying plate having complementary fittings connectable to fittings on said support upon insertion of said mold and said adapter plates into position.

4. The injection-molding machine defined in claim 3 wherein said mold-carrying plate provided with said complementary fittings is said one of said mold-carrying plates and said adapter plate provided with said support is shiftable linearly along said path to engage its service fittings with complementary fittings for electrical and fluid service of the mold.

5. The injection-molding machine defined in claim 3 wherein the mold-carrying plate provided with said complementary fittings is movable toward and away from the other mold-carrying plate and said complementary fittings engage the service fittings of the respective adapter plate during such movement.

6. The injection-molding machine defined in claim 1 wherein at least one of said mold-carrying plates is provided with at least one control element regulating a parameter of operation of the injection-molding machine, respective mold-carrying plate engaging said element to set the same to control said parameter in accordance with a mold to which the said mold-carrying plate is affixed.

7. The injection-molding machine defined in claim 1 wherein said guide means includes a bar formed on said one of said mold-carrying plates and having inclined guide surfaces for orienting the respective mold-carrying plate along said path, the latter mold-carrying plate having inclined guide surfaces cooperating with the guide surfaces of said bar.

8. The injection-molding machine defined in claim 1 wherein said one of said mold-carrying plates is provided with at least one service fitting, the respective adapter plate being provided with a cutout receiving said fitting and protecting same upon insertion of said mold into position.

9. The injection-molding machine defined in claim 1 wherein said locking means includes a plurality of swingable fingers mounted on the respective mold-carrying plates and swingable to press the respective adapter plate against each mold-carrying plate.

10. The injection-molding machine defined in claim 9 wherein each of said fingers forms an arm of a lever constituting part of a double-lever toggle assembly, further comprising fluid pressure means operatively connected to each of said toggle assemblies for actuating the respective fingers.

11. The injection-molding machine defined in claim 10 wherein each of said toggle assemblies includes a double arm first lever having one arm forming a respective finger and another arm, and a link connecting said other arm to a second lever, said second lever being connected to the piston of a fluid-pressure cylinder, said levers being positioned such that said second lever directly abuts said first lever when the respective finger is engaged against a respective adapter plate.

12. The injection-molding machine defined in claim 1 wherein said guide means includes guide bars engageable with opposite longitudinal edges of a respective adapter plate and having surfaces reaching over the respective adapter plate to retain the same against the respective mold-carrying plate.

13. The injection-molding machine defined in claim 12 wherein said locking means includes fluid-pressure displaceable cams on said bars having wedging surfaces pressing the respective adapter plates against each mold-carrying plate.

14. The injection-molding machine defined in claim 13 wherein each of said cams is connected to a respective fluid cylinder disposed externally of said bars.

15. The injection-molding machine defined in claim 1, further comprising a roller conveyer disposed alongside said positon for guiding a mold into and out of said position.

16. The injection-molding machine defined in claim 1, further comprising a carriage shiftable in said direction and having a roller conveyer for receiving a mold from said position and introducing a mold into said position.

17. The injection-molding machine defined in claim 16 wherein said carriage is provided with a pusher for displacing said molds along said roller conveyer.

18. The injection-molding machine defined in claim 11, further comprising a carriage shiftable in said direction and having a roller conveyer for receiving a mold from said position and introducing a mold into said position.

19. The injection-molding machine defined in claim 18 wherein said carriage is provided with a pusher for displacing said molds along said roller conveyer.

* * * * *